United States Patent
Yen et al.

(10) Patent No.: US 9,219,627 B2
(45) Date of Patent: Dec. 22, 2015

(54) CIRCUIT AND METHOD FOR TRANSMITTING OR RECEIVING SIGNAL

(71) Applicant: MStar Semiconductor, Inc., Hsinchu Hsien (TW)

(72) Inventors: Shih-Chieh Yen, Hsinchu Hsien (TW); Yao-Chi Wang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/197,671

(22) Filed: Mar. 5, 2014

(65) Prior Publication Data

US 2014/0254641 A1  Sep. 11, 2014

(30) Foreign Application Priority Data

Mar. 6, 2013  (TW) .............................. 102107877 A

(51) Int. Cl.
| | |
|---|---|
| *H04B 1/38* | (2015.01) |
| *H04L 27/00* | (2006.01) |
| *H04L 23/00* | (2006.01) |
| *H04L 25/08* | (2006.01) |
| *H04B 1/00* | (2006.01) |
| *H04N 5/46* | (2006.01) |
| *H04L 29/06* | (2006.01) |

(52) U.S. Cl.
CPC .............. *H04L 25/08* (2013.01); *H04B 1/0071* (2013.01); *H04L 69/18* (2013.01); *H04N 5/46* (2013.01)

(58) Field of Classification Search
CPC ...... H04B 1/005; H04B 1/0003; H04B 1/406; H04B 1/0007; H04B 1/0075; H04B 1/0082; H04B 88/06; H04B 1/0483; H04W 88/06; H04W 88/10; H04H 2201/183; H04L 27/0008; H04L 69/18; H04N 5/46

USPC .................. 375/219, 260, 295, 316
See application file for complete search history.

(56) References Cited

U.S. PATENT DOCUMENTS

| | | | |
|---|---|---|---|
| 6,167,099 A * | 12/2000 | Rader et al. ................... | 375/347 |
| 7,493,141 B2 * | 2/2009 | Brobston et al. ........... | 455/552.1 |
| 8,711,903 B2 * | 4/2014 | Rheinfelder et al. ......... | 375/219 |
| 8,798,560 B2 * | 8/2014 | Walley et al. ................. | 455/118 |
| 2004/0190559 A1 * | 9/2004 | Adolfsen et al. .............. | 370/503 |
| 2005/0032480 A1 * | 2/2005 | Lee et al. ........................ | 455/76 |
| 2005/0201494 A1 * | 9/2005 | Yoon ............................. | 375/340 |
| 2007/0015472 A1 * | 1/2007 | Murtojarvi ............ | H03F 1/0261 455/102 |
| 2008/0120450 A1 * | 5/2008 | Mott et al. ..................... | 710/113 |
| 2010/0261437 A1 * | 10/2010 | Behzad et al. .................. | 455/77 |
| 2011/0249770 A1 * | 10/2011 | Bellaouar ............. | H03F 1/0261 375/296 |
| 2012/0026407 A1 * | 2/2012 | Zhang et al. .................. | 348/731 |

* cited by examiner

*Primary Examiner* — Tesfaldet Bocure
(74) *Attorney, Agent, or Firm* — Edell, Shapiro & Finnan, LLC

(57) ABSTRACT

A circuit, including a receiving path, for converting a first analog radio frequency (RF) input signal to a digital intermediate frequency (IF) input signal, wherein the first analog RF input signal includes a first signal component conforming to a first wireless transmission standard and a second signal component conforming to a second wireless transmission standard; a first digital down converter, for receiving and processing the digital IF input signal to generate a first digital baseband signal corresponding to the first signal component; a second digital down converter, for receiving and processing the digital IF input signal in order to generate a second digital baseband signal corresponding to the second signal component; a first baseband processing module, for processing the first digital baseband signal according to the first wireless transmission standard; and a second baseband processing module, for processing the second digital baseband signal according to the second wireless transmission standard.

27 Claims, 13 Drawing Sheets

CIRCUIT AND METHOD FOR TRANSMITTING OR RECEIVING SIGNAL

CROSS REFERENCE TO RELATED APPLICATIONS

This application claims priority under 35 U.S.C. 119 to Taiwan patent application, TW102107877, filed on Mar. 6, 2013, the disclosure of which is incorporated herein by reference.

BACKGROUND OF THE INVENTION

1. Field of the Invention

The present invention relates to signal transmitting or receiving circuit and method, and more particularly, to signal transmitting or receiving circuit and method for processing signals conforming to different wireless transmission standards by using single signal transceiving circuit.

2. Description of the Prior Art

Traditionally, signals conforming to different wireless transmission standards are processed by different signal transceiving circuits. For example, one signal transceiving circuit is used to process signals conforming to WiFi standard and another signal transceiving circuit is used to process signals conforming to Bluetooth standard. However, processing signals conforming to different standards with different signal transceiving circuits not only uses larger circuit area but also consumes more electrical energy. Furthermore, with the trend of electronics miniaturization, shrinking space between these signal transceiving circuits results in heavier signal interference.

SUMMARY OF THE INVENTION

One of the objectives of the present invention is to provide signal receiving circuit, signal transmitting circuit, and signal transceiving circuit for processing signal conforming to different wireless transmission standards by utilizing the same circuit.

One of the objectives of the present invention is to provide signal receiving method, signal transmitting method, and signal transceiving method for processing signal conforming to different wireless transmission standards by utilizing the same circuit.

One embodiment of the present invention discloses a signal receiving circuit, comprising: a receiving path, configured for converting a first analog radio frequency (RF) input signal to a digital intermediate frequency (IF) input signal and outputting the digital IF input signal, wherein the first analog RF input signal comprises a first signal component conforming to a first wireless transmission standard and a second signal component conforming to a second wireless transmission standard; a first digital down converter, configured for receiving and processing the digital IF input signal to generate a first digital baseband signal corresponding to the first signal component; a second digital down converter, configured for receiving and processing the digital IF input signal to generate a second digital baseband signal corresponding to the second signal component; a first baseband processing module, configured for processing the first digital baseband signal according to the first wireless transmission standard; and a second baseband processing module, configured for processing the second digital baseband signal according to the second wireless transmission standard.

Another embodiment of the present invention discloses a signal transmitting circuit, comprising: a first baseband signal processing module, configured for outputting a first digital baseband signal conforming to a first wireless transmission standard; a second baseband signal processing module, configured for outputting a second digital baseband signal conforming to a second wireless transmission standard; a first digital up converter, configured for receiving and processing the first digital baseband signal to generate a first digital IF signal; a second digital up converter, configured for receiving and processing the second digital baseband signal to generate a second digital IF signal; and a transmitting path, configured for converting the first digital IF signal to a first analog output signal and outputting the first analog output signal or converting the second digital IF signal to a second analog output signal and outputting the second analog output signal.

Another embodiment of the present invention discloses a signal receiving circuit, comprising: a receiving path, configured for converting a first analog RF input signal to a digital IF input signal and outputting the digital IF input signal, wherein the first analog RF input signal comprises a plurality of signal components conforming to at least one wireless transmission standard; a digital down converting module, comprising M digital down converters, configured for receiving and processing the digital IF input signal to generate M digital baseband signals with respect to the plurality of signal components, wherein M is a positive integer equals to or larger than 2; and N baseband signal processing modules, configured for processing the M digital baseband signals according to corresponding wireless transmission standard, wherein N is a positive integer equals to or larger than 2, wherein the digital down converters and the baseband signal processing modules are interconnected in at least one of the following ways: each of the digital down converters is coupled to at least one of the baseband signal processing modules; and each of the baseband signal processing modules is coupled to at least one of the digital down converters.

Another embodiment of the present invention discloses a signal transmitting circuit, comprising: N baseband signal processing modules, configured for outputting N digital baseband signals conforming to at least one wireless transmission standard, wherein N is a positive integer equals to or larger than 2; a digital up converting module, comprising M digital up converters, configured for receiving and processing the digital baseband signals to generate M digital IF signals, wherein M is a positive integer equals to or larger than 2; and a transmitting path, configured for converting the digital IF signals to analog RF output signals, respectively, and outputting the analog RF output signals; wherein the digital up converters and the baseband signal processing modules are interconnected in at least one of the following ways: each of the digital up converters is coupled to at least one of the baseband signal processing modules; and each of the baseband signal processing modules is coupled to at least one of the digital up converters.

Combining the fore mentioned signal transmitting circuits with signal receiving circuits, a signal transceiving circuit could be concluded. A first and a second baseband signal processing modules included in the signal transceiving circuit can receive signals from the receiving path or can transmit signals to the transmitting path. Other components of the signal transceiving circuit can be analogous to the components in the signal transmitting circuits and the signal receiving circuits. No further description is duplicated here.

According to the signal transmitting circuit, signal receiving circuit, and signal transceiving circuit, corresponding signal transmitting method, signal receiving method, and signal transceiving method can be derived. Since the steps of these methods are analogous to the components in the circuits. No further description is duplicated here.

According to the fore mentioned embodiments, transmitting signals conforming to different wireless transmission signals by one circuit can be realized. Hence the problems addressed in the prior art is avoided.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1A:
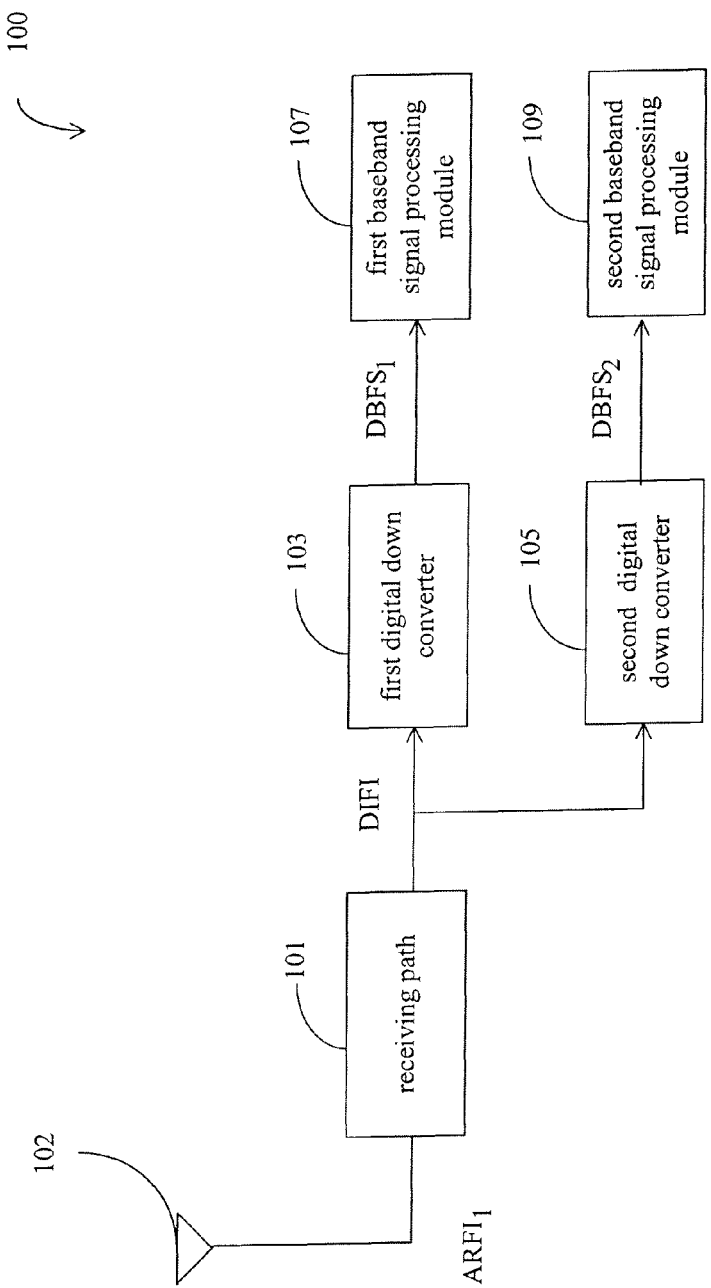
FIG. 1A illustrates a signal receiving circuit according to an embodiment of the present invention.

Please refer to FIG. 1A, which illustrates a signal receiving circuit 100 according to an embodiment of the present invention. As shown in FIG. 1A, the signal receiving circuit 100 includes a receiving path 101, a first digital down converter 103, a second digital down converter 105, a first baseband signal processing module 107, and a second baseband signal processing module 109. The receiving path 101 is configured for converting a first analog radio frequency (RF) input signal $ARFI_1$ to a digital intermediate frequency (IF) input signal DIFI. The first analog RF input signal $ARFI_1$ includes a first signal component and a second signal component. The first signal component conforms to a first wireless transmission standard (e.g., WiFi) and the second signal component conforms to a second wireless transmission standard (e.g., Bluetooth). The first digital down converter 103 receives the digital IF input signal DIFI and filters and down converts the digital IF input signal DIFI to extract the first signal component as a first digital baseband signal $DBFS_1$. The second digital down converter 105 receives the digital IF input signal DIFI and filters and down converts the digital IF input signal DIFI to extract the second signal component as a second digital baseband signal $DBFS_2$. The first baseband signal processing module 107 processes the first digital baseband signal $DBFS_1$ according to the first wireless communication standard. The second baseband signal processing module 109 processes the second digital baseband signal $DBFS_2$ according to the second wireless communication standard.

Figure 1B:
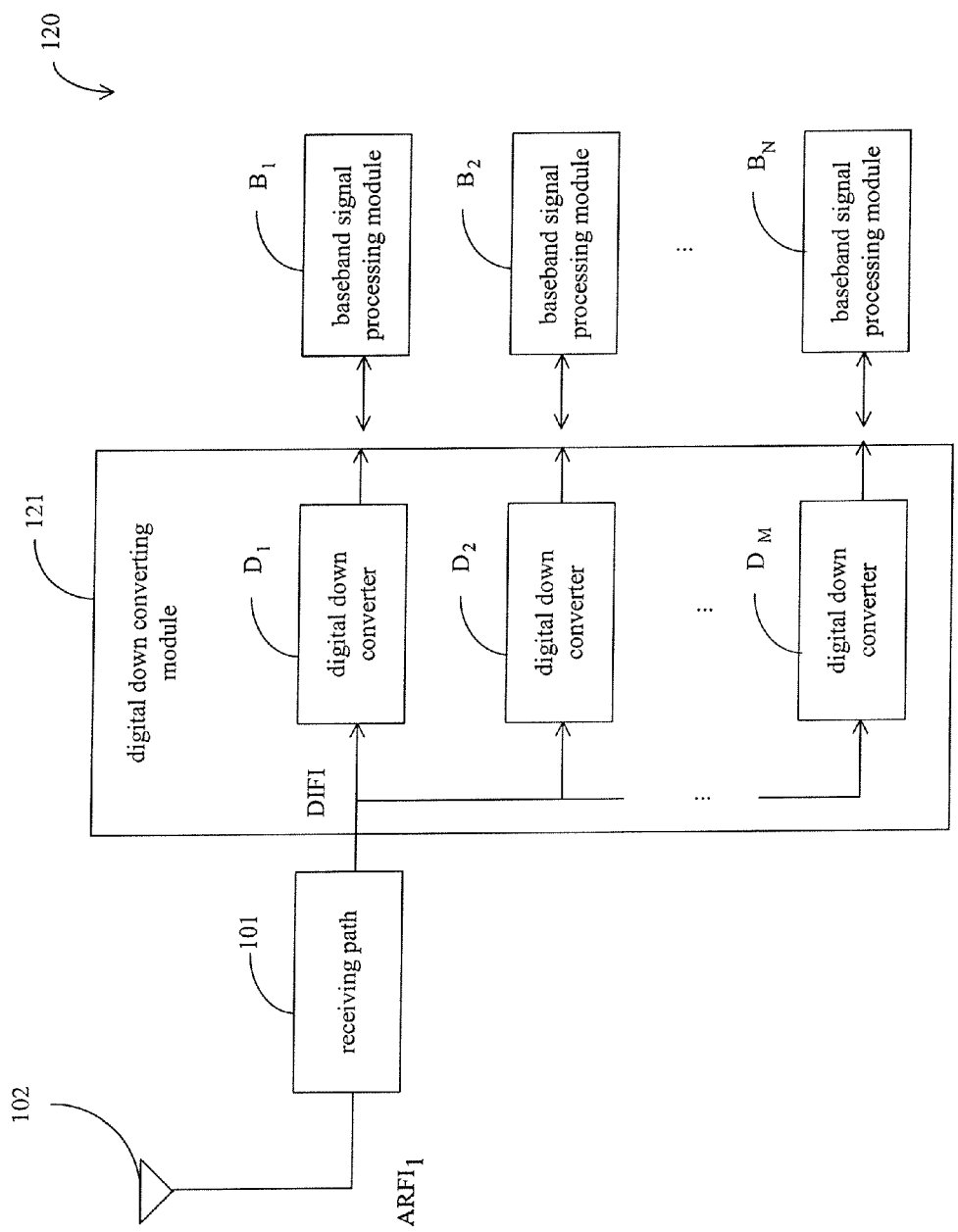
FIG. 1B depicts a variation of the embodiment shown in FIG. 1A.

Please refer to FIG. 1B, which depicts a variation of the embodiment shown in FIG. 1A. As shown in FIG. 1B, a signal receiving circuit 120 also includes the receiving path 101. In addition, the signal receiving circuit 120 also includes a digital down converting module 121 and N baseband signal processing modules $B_1$ to $B_N$. The digital down converting module 121 includes M digital down converters $D_1$ to $D_M$. M and N may be the same positive integer which is larger than 2, or different positive integers larger than 2. In this instance, the first analog RF input signal $ARFI_1$ comprises a plurality of signal components which conforms to at least one wireless communication standard. The first analog RF input signal $ARFI_1$ is first converted to a digital IF input signal DIFI, sent to the digital down converters $D_1$ to $D_M$ for filtering and down converting, and then sent to at least one of the baseband signal processing modules $B_1$ to $B_N$. The digital down converters $D_1$ to $D_M$ may be one-to-one mapping to the baseband signal processing modules $B_1$ to $B_N$, i.e., each of digital down converters $D_1$ to $D_M$ is at most coupled to one of the baseband signal processing modules $B_1$ to $B_N$, and different digital down converters are coupled to different baseband signal processing modules. Alternatively, The digital down converters $D_1$ to $D_M$ may be many-to-many mapping to the baseband signal processing modules $B_1$ to $B_N$, i.e., each of the digital down converters $D_1$ to $D_M$ may be coupled to more than one of the baseband signal processing modules $B_1$ to $B_N$. Also, each of the baseband signal processing modules $B_1$ to $B_N$ may be coupled to more than one of the digital down converters $D_1$ to $D_M$. The baseband signal processing modules $B_1$ to $B_N$ may be capable of dealing with different N wireless transmission standards. Alternatively, two or more of the baseband signal processing modules $B_1$ to $B_N$ may be capable of dealing with the same wireless transmission standard. In such architecture, interconnectivities between the digital down converters and baseband signal processing modules could be easily adjusted according to design requirements. It is also easy to designate wireless transmission standards to specific baseband signal processing modules. As a result, the applicability of signal receiving circuit according to the present invention is improved. However, please be aware that although the variation shown in FIG. 1B is based on the embodiment shown in FIG. 1, the variation shown in FIG. 1B could also be applicable to embodiments shown in FIGS. 3, 4, and 7A. Besides, the structures shown in FIGS. 3 and 4 can be applicable to the variation shown in FIG. 1B.

Figure 2A:
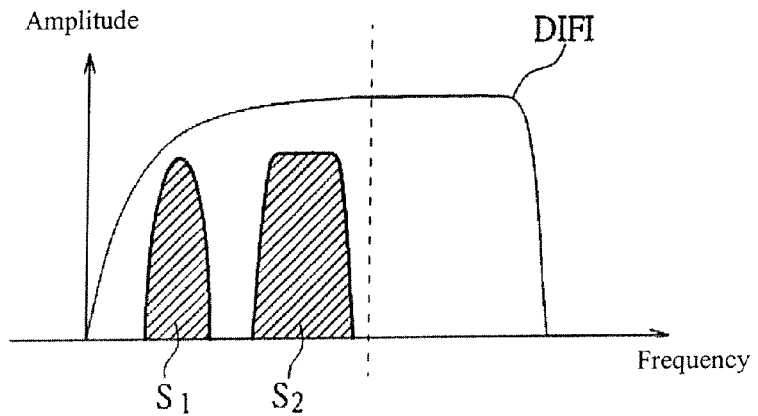
FIGS. 2A, 2B, and 2C depict diagrams with respect to the signal receiving circuit shown in FIG. 1A.
Figure 2B:
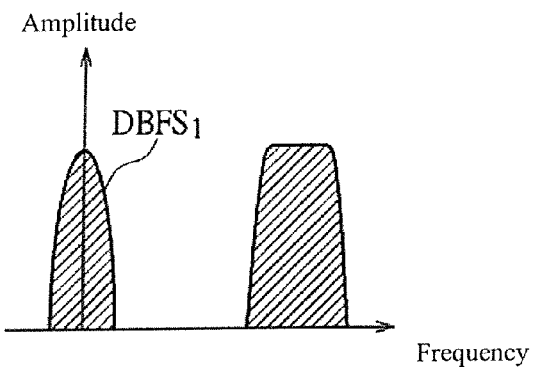
Figure 2C:
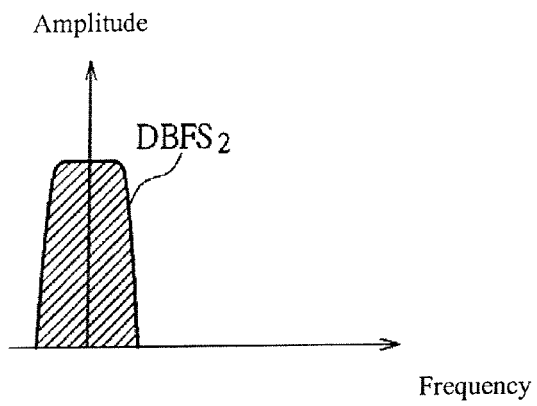

FIGS. 2A, 2B, and 2C depict spectrum diagrams with respect to operations of the signal receiving circuit 100 shown in FIG. 1A. Already mentioned in paragraphs above, the first analog RF input signal $ARFI_1$ includes a first signal component and a second signal component. The digital IF input signal DIFI converted from the first analog RF input signal $ARFI_1$ also includes the first signal component $S_1$ and the second signal component $S_2$ as shown in FIG. 2A. After the first digital down converter 103 and the second digital down converter 105 down convert and filter the digital IF input signal DIFI, a first digital baseband signal $DBFS_1$ and a second digital baseband signal $DBFS_2$ are generated as shown in FIGS. 2B and 2C, respectively. In other words, the signal receiving circuit in accordance with the present invention receives signal components conforming to different wireless transmission standards (such as the first signal component $S_1$ and the second signal component $S_2$ in different bands shown in FIG. 2A.) After receiving, different digital down converters perform filtering in different ways such that different signal components conforming to different wireless transmission standards could be extracted from the same digital IF input signal DIFI, respectively, without being mixed with other components conforming to other wireless transmission standards.

Figure 3:
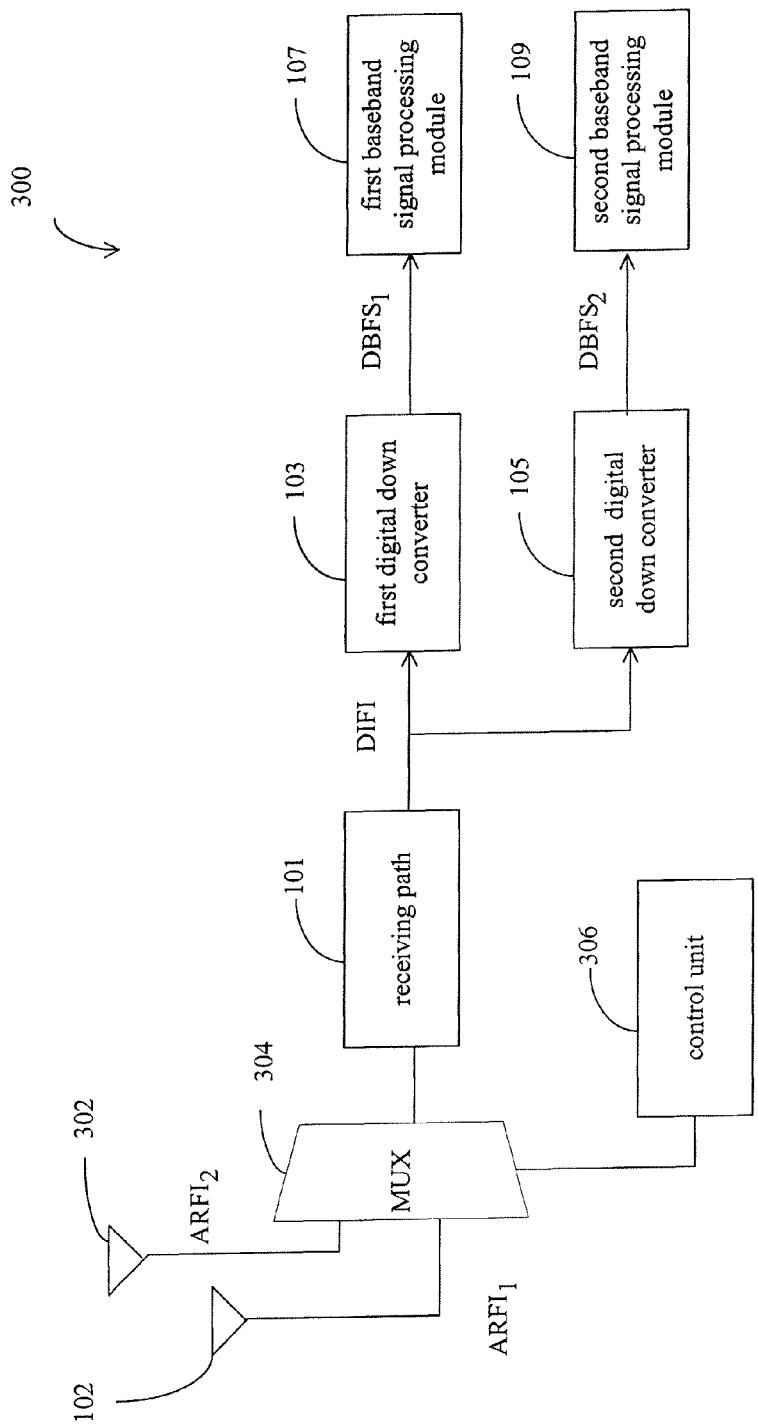
FIG. 3 shows a signal receiving circuit in accordance with another embodiment of the present invention.

Please refer to FIG. 3, which shows a signal receiving circuit 300 in accordance with another embodiment of the present invention. In the embodiment shown in FIG. 1A, the signal receiving circuit 100 includes only one antenna 102 for receiving a first analog RF input signal $ARFI_1$. The signal receiving circuit 300 further includes another antenna 302 for receiving a second analog RF input signal $ARFI_2$. The second analog RF input signal $ARFI_2$ also includes multiple signal components conforming to different wireless transmission standards. Hence, the signal receiving circuit further includes a multiplexer 304 for selectively outputting one of the first analog RF input signal $ARFI_1$ and the second analog RF input signal $ARFI_2$ to the receiving path 101. The multiplexer 304 may be controlled by a control unit 306. After inputted in the receiving path 101, the processing of the second analog RF input signal $ARFI_2$ is identical to that of the first analog RF input signal $ARFI_1$, and is omitted herein. In such architecture, in case analog RF input signal comprises signal components conforming to different wireless transmission standards traversing in neighboring frequency bands, analog RF input signal can be received separately in order to prevent mutual interference. In one embodiment, at least one signal component included in the second analog RF input signal $ARFI_2$ is different from those signal components included in the first analog RF input signal $ARFI_1$.

Figure 4:
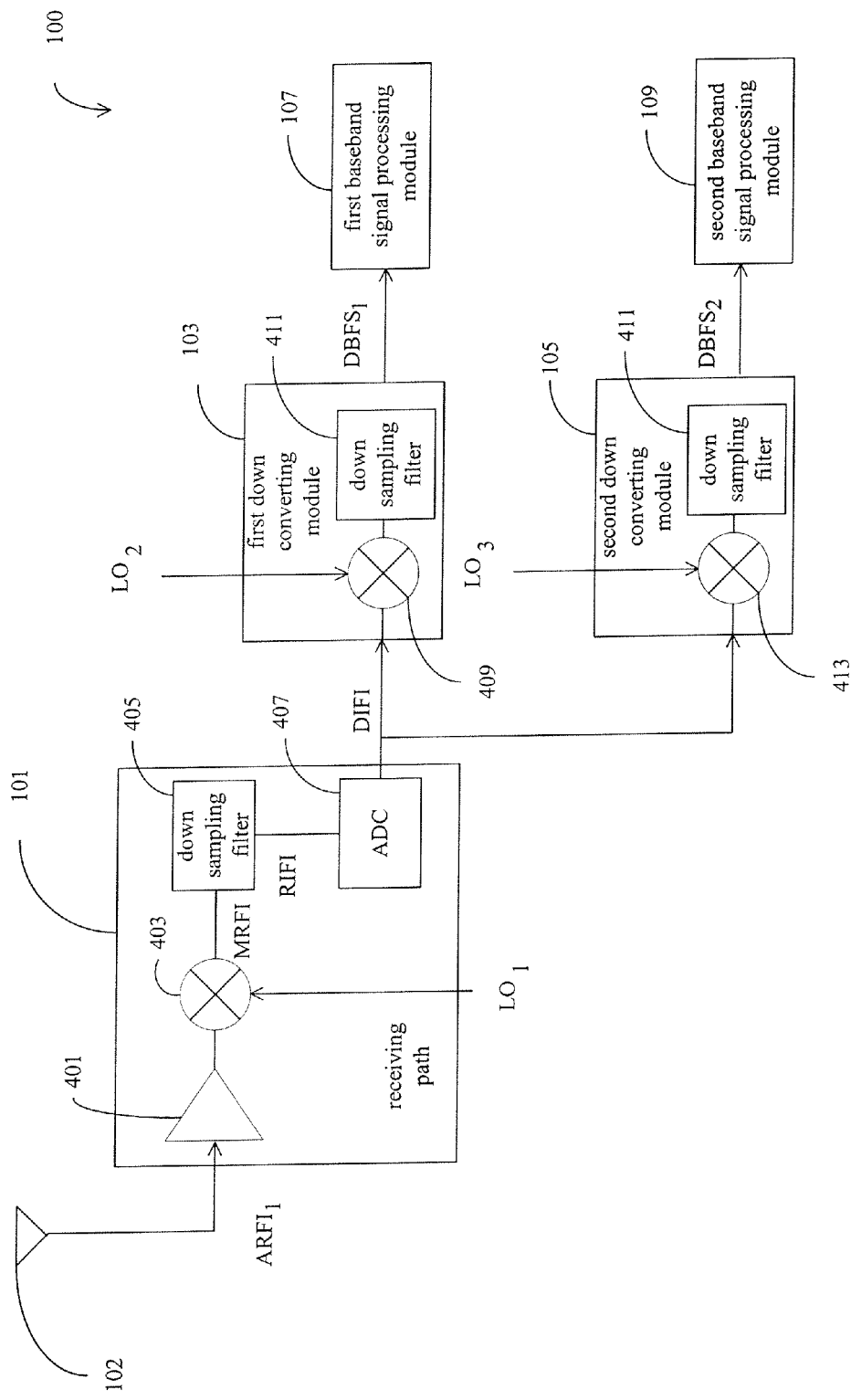
FIG. 4 illustrates one example of details of signal receiving circuit shown in FIG. 1A.

Please refer to FIG. 4, which illustrates details of signal receiving circuit 100 shown in FIG. 1A, according to an embodiment of the present invention. Please be aware that the circuit shown in FIG. 4 is merely exemplary, not to limit the present invention. As shown in FIG. 4, the receiving path 101 comprises an amplifier 401, a mixer 403, a down sampling filter 405, and an analog digital converter (ADC) 407. The amplifier 401 is configured for amplifying the first analog RF input signal $ARFI_1$ to make it easier to be processed. The mixer 403 is configured for receiving a carrier signal $LO_1$ and mixing the carrier signal $LO_1$ with the analog RF input signal $ARFI_1$ to generate a mixed RF input signal MRFI. The down sampling filter 405 is configured for filtering and down sampling the mixed RF input signal MRFI to generate an analog IF input signal RIFI. The ADC 407 is configured for converting the analog IF input signal RIFI to a digital IF input signal DIFI.

In this embodiment, the first digital down converter 103 and the second digital down converter 105 include mixers 409 and 413 as well as down sampling filters 411 and 415, respectively. The mixers 409 and 413 receive the carrier signals $LO_2$ and $LO_3$, respectively, for tuning the digital IF input signal DIFI to different frequency. The down sampling filters 411 and 415 respectively down sample and differently filter the digital IF input signal DIFI to generate the first digital baseband signal $DBFS_1$ and the second digital baseband signal $DBFS_2$. Please be aware that the reason to introduce the carrier signals $LO_2$ and $LO_3$ is to tune the digital IF input signal DIFI to the proper frequency bands for further processing by the down sampling filters 411 and 415, respectively. In case that the received digital input signal DIFI is already tuned to the proper frequency bands, the down sampling filters 411 and 415 can be curtailed. Besides, the first digital down converter 103 and the second digital down converter 105 could be implemented by other circuit designs.

Figure 5A:
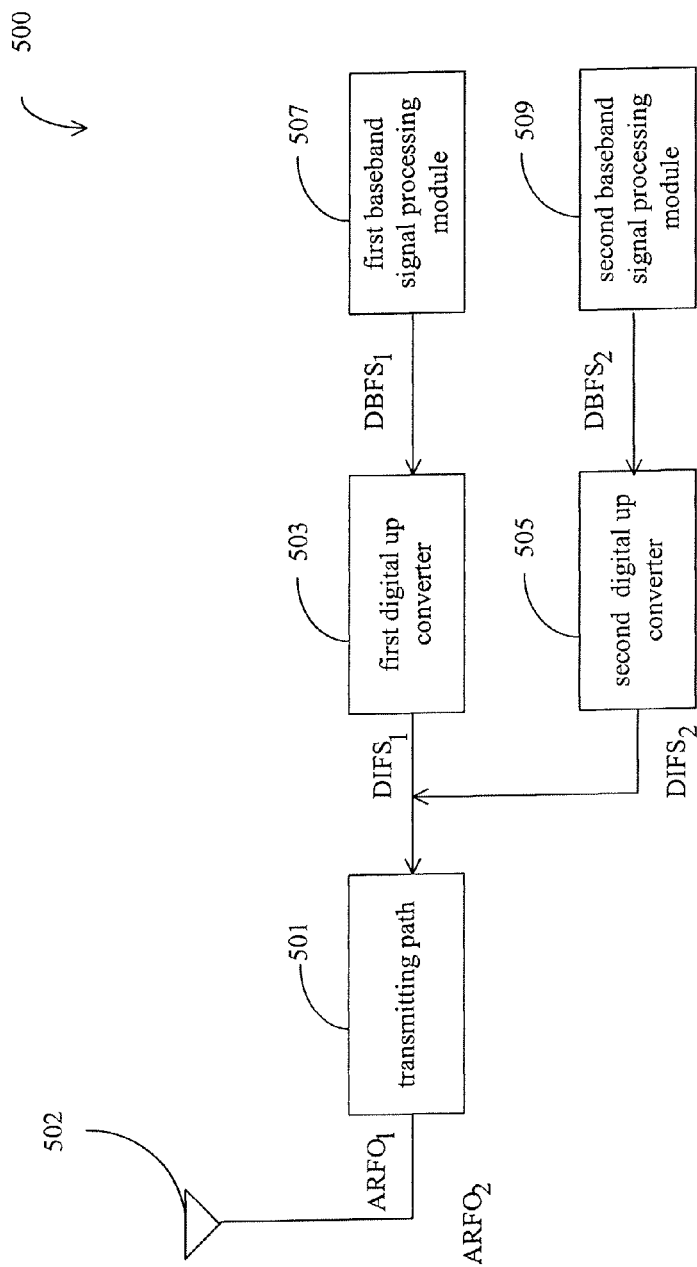
FIG. 5A depicts a signal transmitting circuit of an embodiment according to the present invention.

Please refer to FIG. 5A, which depicts a signal transmitting circuit 500 of an embodiment according to the present invention. As shown in FIG. 5A, the signal transmitting circuit 500 comprises a transmitting path 501, a first digital up converter 503, a second digital up converter 505, a first baseband signal processing module 507, and a second baseband signal processing module 509. The first baseband signal processing module 507 is configured for outputting a first digital baseband signal $DBFS_1$ conforming to a first wireless transmission standard (e.g., WiFi standard). The second baseband signal processing module 509 is configured for outputting a second digital baseband signal $DBFS_2$ conforming to a second wireless transmission standard (e.g., Bluetooth standard). The first digital up converter 503 is configured for receiving, filtering and up sampling (e.g., interpolating) the first digital baseband signal $DBFS_1$ to generate a first digital IF signal $DIFS_1$. The second digital up converter 505 is configured for receiving, filtering and up sampling the second digital baseband signal $DBFS_2$ to generate a second digital IF signal $DIFS_2$. The transmitting path 501 is configured for converting the first digital IF signal $DIFS_1$ to a first analog RF output signal $ARFO_1$ or for converting the second digital IF signal $DIFS_2$ to a second analog RF output signal $ARFO_2$. The transmitting path 501 is further configured for outputting the first digital IF signal $DIFS_1$ or the second digital IF signal $DIFS_2$ (to antenna 502 for instance.)

Figure 5B:
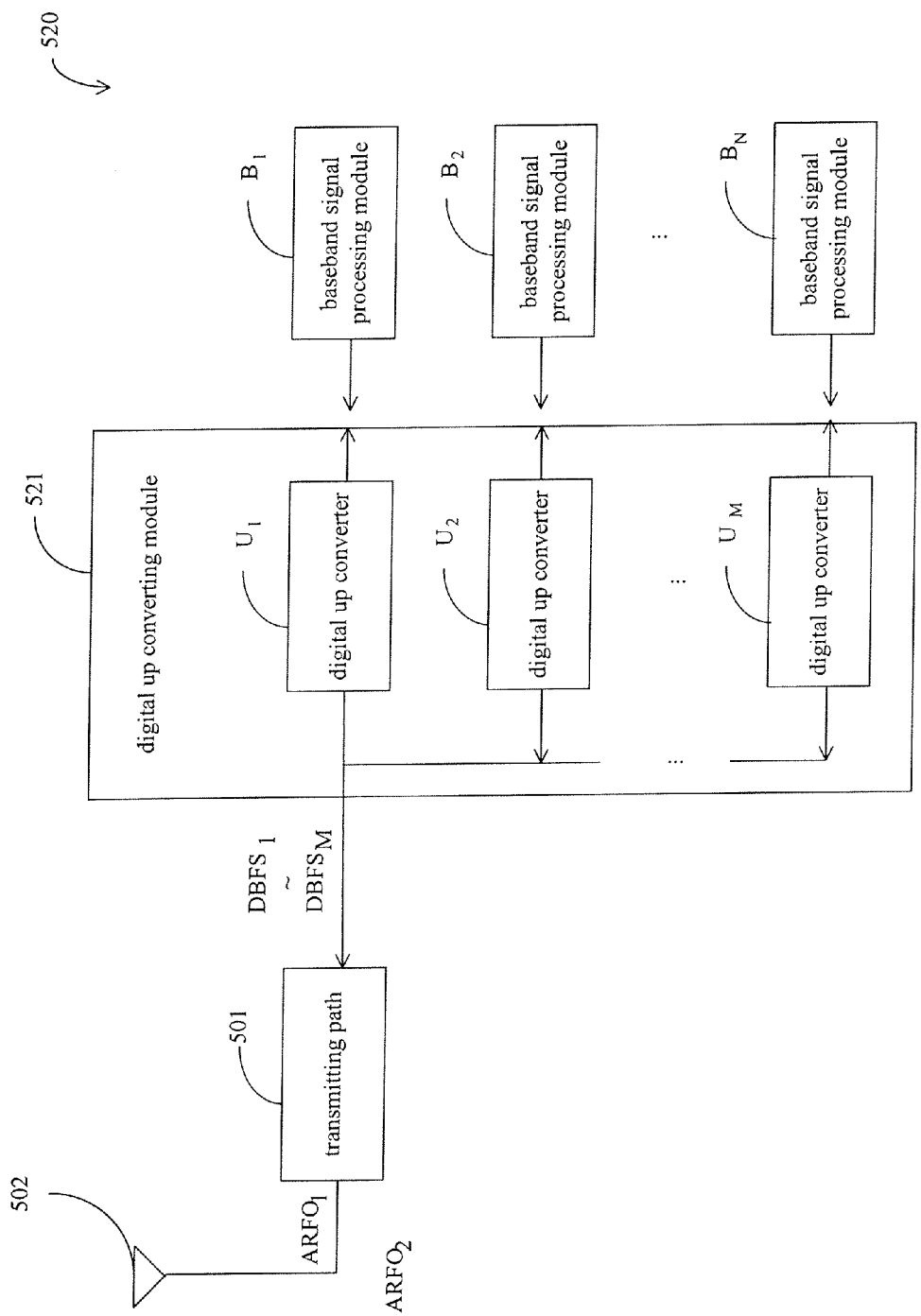
FIG. 5B shows a variation of the embodiment shown in FIG. 5A.

Please refer to FIG. 5B, which shows a variation of the embodiment shown in FIG. 5A. As shown in FIG. 5B, the signal transmitting circuit 520 also include the transmitting path 501. Additionally, a digital up converting module 521 and N baseband signal processing modules $B_1$ to $B_N$ are included, too. The digital up converting module 521 includes M digital up converters $U_1$ to $U_M$. M and N may be the same positive integer which is larger than 2. Alternatively, M and N may be different positive integers which are both larger than 2. After receiving digital baseband signals $DBFS_1$ to $DBFS_N$ from the baseband signal processing modules $B_1$ to $B_N$, the digital up converters $U_1$ to $U_M$ filter and up convert the digital baseband signals $DBFS_1$ to $DBFS_N$ to generate digital intermediate frequency signals $DIFS_1$ to $DIFS_M$. The digital up converters $U_1$ to $U_M$ may be one-to-one mapping to the baseband signal processing modules $B_1$ to $B_N$, i.e., each one of the digital up converters $U_1$ to $U_M$ is at most coupled to one of the baseband signal processing modules $B_1$ to $B_N$. And different digital up converters are coupled to different baseband signal processing modules. Alternatively, the digital up converters $U_1$ to $U_M$ may be many-to-many mapping to the baseband signal processing modules $B_1$ to $B_N$, i.e., each one of the digital up converters $U_1$ to $U_M$ is coupled to multiple modules of the baseband signal processing modules $B_1$ to $B_N$. Also, each of the baseband signal processing modules $B_1$ to $B_N$ may be coupled to multiple digital up converters $U_1$ to $U_M$. In such circumstance, the baseband signal processing modules $B_1$ to $B_N$ may deal with N different wireless transmission standards, or two or more of the baseband signal processing modules $B_1$ to $B_N$ may be capable of dealing with the same wireless transmission standard. In such architecture, interconnectivities between the digital up converters and baseband signal processing modules could be easily adjusted according to design requirements. It is also easy to designate a wireless transmission standard to specific one of the baseband signal processing modules. As a result, the applicability of signal transmitting circuit according to the present invention is improved. Please be aware that although the embodiment shown in FIG. 5B is based on the embodiment shown in FIG. 5A, it could be utilized in the embodiments shown in FIG. 6 and FIG. 7A. Besides, the structure shown in FIG. 6 can be applicable to the variation shown in FIG. 5B.

Figure 6:
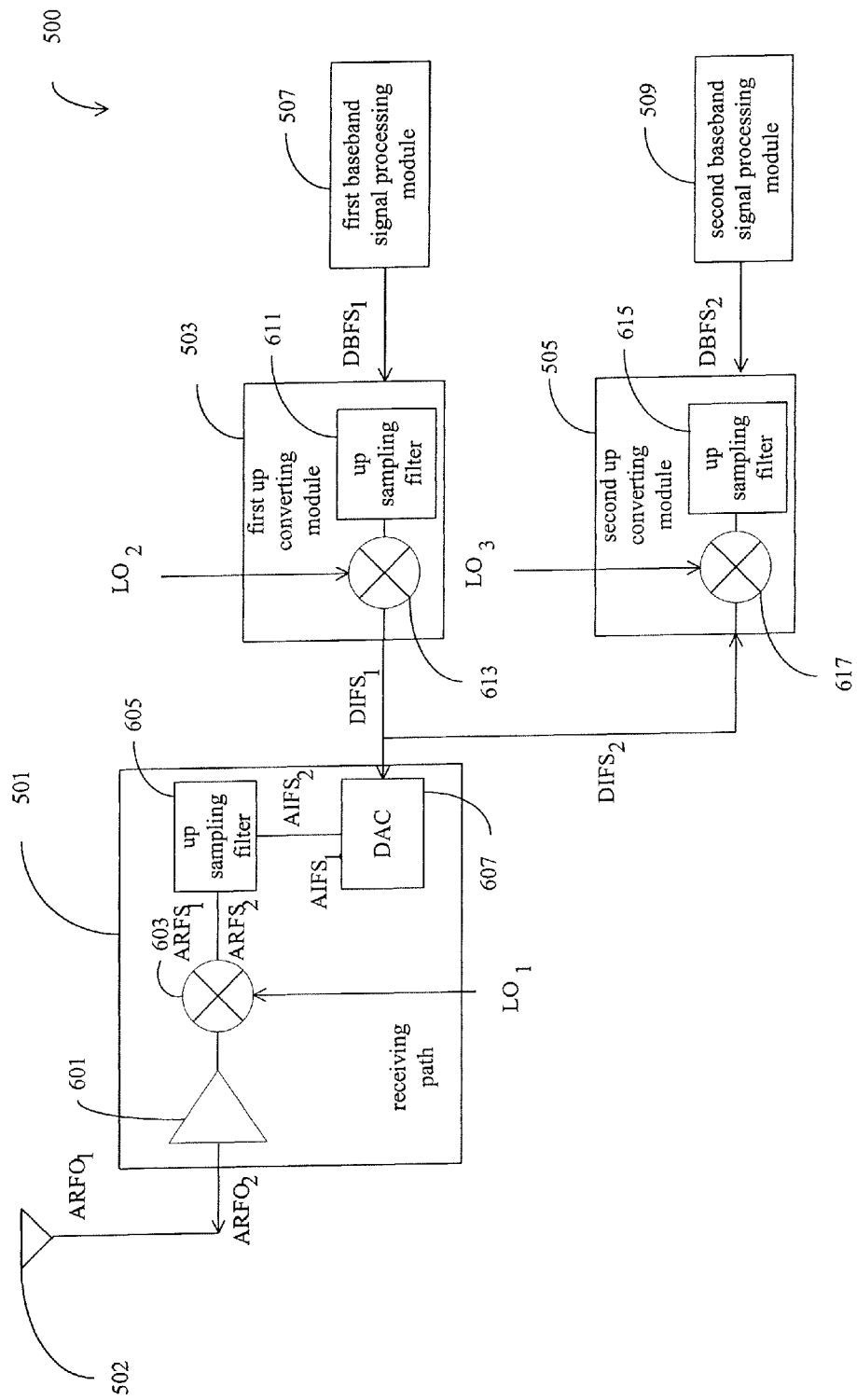
FIG. 6 illustrates one example of details of signal transmitting circuit shown in FIG. 5A.

Please refer to FIG. 6, which illustrates details of the signal transmitting circuit 500 shown in FIG. 5A, according to an embodiment of the present invention. Please be aware that the circuit shown in FIG. 6 is merely exemplary, not to limit the present invention. The first digital up converter 503 and the second digital up converter 505 comprise mixers 613 and 617 as well as up sampling filters 611 and 615, respectively. The up sampling filters 611 and 615 up sample and differently filter the first digital baseband signal $DBFS_1$ and the second digital baseband signal $DBFS_2$, respectively. The mixers 613 and 617 receive carrier signals $LO_2$ and $LO_3$ for converting outputs of the up sampling filters 611 and 615 to different frequencies to generate a first digital intermediate frequency signal $DIFS_1$ and a second digital intermediate frequency signal $DIFS_2$, respectively. However, please be aware that the carrier signals $LO_2$ and $LO_3$ are used to tune the first digital intermediate frequency signal $DIFS_1$ and second digital intermediate frequency signal $DIFS_2$ to proper frequency bands for further processing in the transmitting path 501. If the first digital baseband signal $DBFS_1$ and the second digital baseband signal $DBFS_2$ received by the transmitting path 501 are already tuned to the proper bands, the mixers 613 and 617 can be curtailed. Also, the first digital up converter 503 and the second digital up converter 505 may be implemented by other circuit designs.

The transmitting path 501 comprises an amplifier 601, a mixer 603, an up sampling filter 605, and a digital-to-analog converter (DAC) 607. The DAC 607 is configured to convert the first digital intermediate frequency signal $DIFS_1$ to a first analog intermediate frequency signal $AIFS_1$ or to convert the second digital intermediate frequency signal $DIFS_2$ to a second analog intermediate frequency signal $AIFS_2$. The up sampling filter 605 is arranged to filter and up sample the first analog intermediate frequency signal $AIFS_1$ or the second analog intermediate frequency signal $AIFS_2$ to respectively generate a first analog radio frequency signal $ARFS_1$ or a second analog radio frequency signal $ARFS_2$. The mixer 603 is arranged to receive a carrier signal $LO_1$ and to mix the first analog radio frequency signal $ARFS_1$ with the carrier signal $LO_1$ to generate a first analog radio frequency output signal $ARFO_1$ or to mix the second analog radio frequency signal $ARFS_2$ with the carrier signal $LO_1$ to generate a second analog radio frequency output signal $ARFO_2$. Analogous to the mixed RF input signal $MRFI_1$, the first analog radio frequency output signal $ARFO_1$ and the second analog radio frequency output signal $ARFO_2$ are mixed signal generated by mixing the input signal with a carrier signal. The amplifier 601 is configured to amplify the first analog radio frequency output signal $ARFO_1$ and the second analog radio frequency output signal $ARFO_2$, such that receiver could receive more clear signal.

Figure 7A:
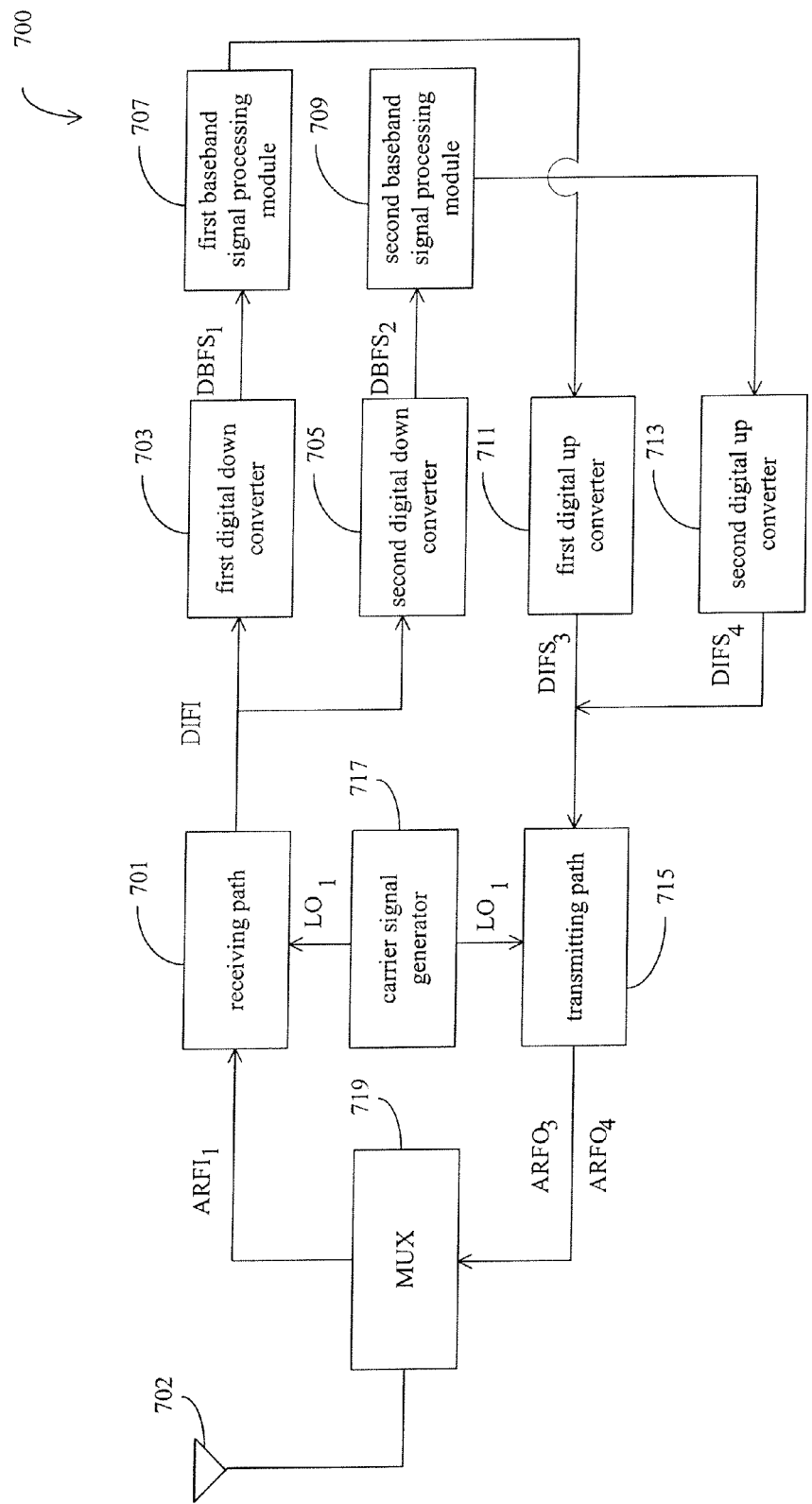
FIG. 7A illustrates a signal transceiving circuit according to one embodiment of the present invention.

Please refer to FIG. 7A, which illustrates a signal transceiving circuit 700 according to one embodiment of the present invention. The signal transceiving circuit 700 is a combination of the signal receiving circuit 100 shown in FIG. 1A and the signal transmitting circuit 500 shown in FIG. 5A. As shown in FIG. 7A, the signal transceiving circuit 700 includes a receiving path 701, a first digital down converter 703, a second digital down converter 705, a first baseband signal processing module 707, a second baseband signal processing module 709, a first digital up converter 711, a second digital up converter 713, and a transmitting path 715. The elements shown in FIG. 7A could use structures shown in FIG. 4 and FIG. 6. The receiving path 701, the first digital down converter 703, the second digital down converter 705, the first baseband signal processing module 707, and the second baseband signal processing module 709 are the same as those corresponding elements of the signal receiving circuit 100 shown in FIG. 1A. The first baseband signal processing module 707, the second baseband signal processing module 709, the first digital up converter 711, the second digital up converter 713, and the transmitting path 715 are the same as those corresponding elements of the signal transmitting circuit 500 shown in FIG. 5A, and are therefore omitted herein. Please be aware that the embodiment shown in FIG. 7A may also include the multiplexer 304 shown in FIG. 3.

Moreover, when the receiving path 701 and the transmitting path 715 use the structures shown in FIG. 4 and FIG. 6, the signal transceiving circuit 700 may further include a carrier signal generator 717 to generate the carrier signal for the mixers in the receiving path 701 and the transmitting path 715. In one embodiment, the carrier signal generator 717 generates the same carrier signal to the mixers in the receiving path 701 and the transmitting path 715. In other words, the signal received by the receiving path 701 and the signal transmitted by the transmitting path 715 are tuned in the same frequency band. Furthermore, in one embodiment, the signal transceiving circuit 700 may include a duplexer 719 which is configured to send a signal to its destined path. For example, when the signal transceiving circuit 700 is receiving signal, the signal received by the antenna 702 is sent to the receiving path 701 rather than to the transmitting path 715. On the contrary, when the signal transceiving circuit 700 is transmitting signal, the signal outputted by the transmitting path 715 is sent to the antenna 702 rather than to the receiving path 701.

Please be aware that although the above embodiments include two digital down converters, two digital up converters, and two baseband signal processing modules, the signal receiving circuit, signal transmitting circuit, and signal transceiving circuit in accordance with the present invention are not limited to use exact two digital up converters, two digital down converters, and two baseband signal processing modules. That is to say, two or more digital up converters, digital down converters, and baseband signal processing modules are intended to be included in the scope of the present invention. Moreover, filters may be properly installed at the output end of elements shown in the above embodiments. Gain of each element may be adjusted according to different wireless transmission standard which the received signal conforming to.

Figure 7B:
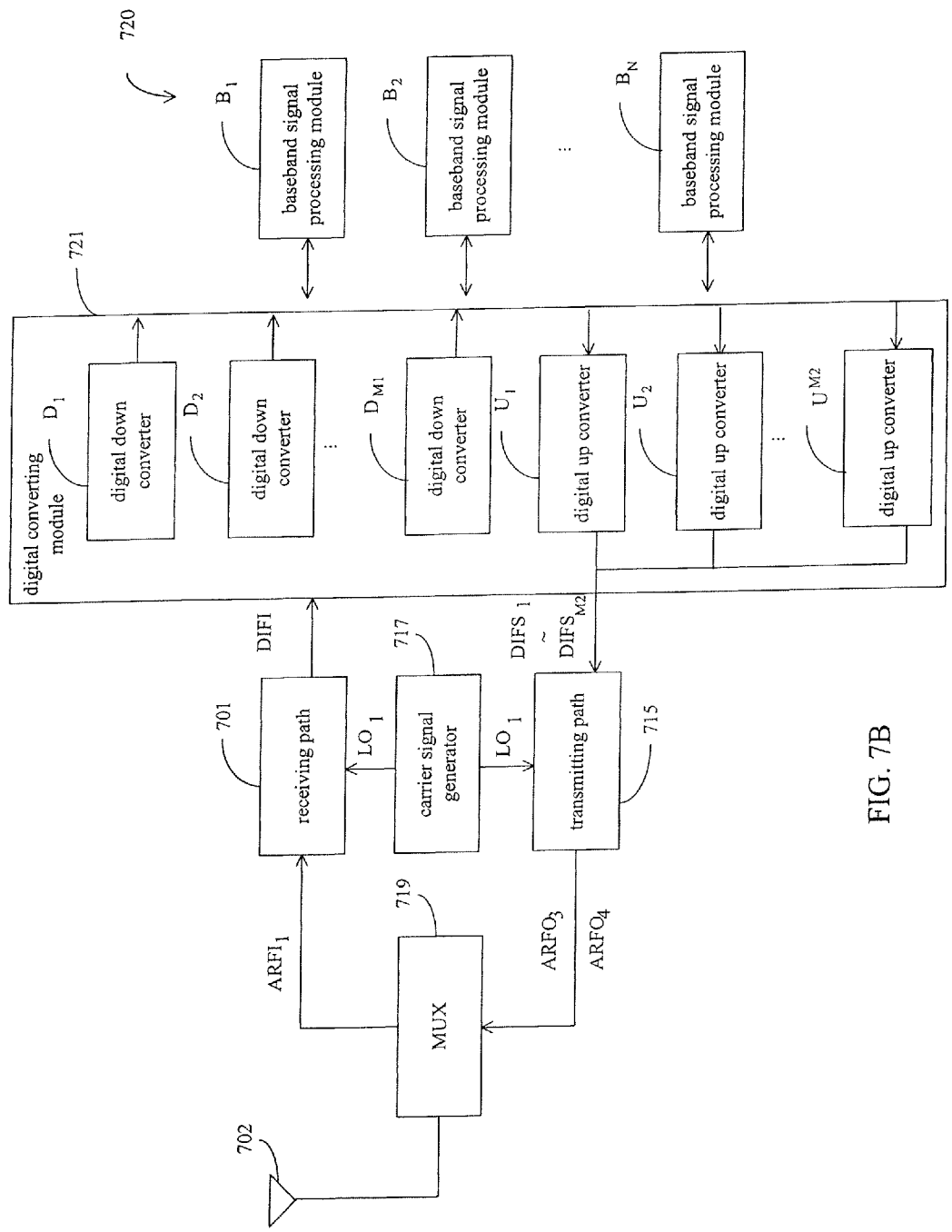
FIG. 7B illustrates a variation of the embodiment shown in FIG. 7A.

Please refer to FIG. 7B, which illustrates a variation of the embodiment shown in FIG. 7A. The signal transceiving circuit 720 shown in FIG. 7B may also, but not necessarily, include the receiving path 701, the transmitting path 715, and the carrier signal generator 717. Besides, the signal transceiving circuit 720 further includes a digital converting module 721 and N baseband signal processing modules. The digital converting circuit 721 comprises $M_1$ digital down converters $D_1$ to $D_{M1}$ and $M_2$ digital up converters $U_1$ to $U_{M2}$. $M_1$ and $M_2$ may be the same positive integer or may be two different positive integers. The interconnectivities between the $M_1$ digital down converters $D_1$ to $D_{M1}$ and the N baseband signal processing modules and operating methods are already described in the embodiment shown in FIG. 1B. Also, the interconnectivities between the $M_2$ digital up converters $U_1$ to $U_{M2}$ and the N baseband signal processing modules are also described in the embodiment shown in FIG. 5B, and the descriptions are omitted herein. Moreover, the structure shown in FIG. 6 could be applied to the embodiment shown in FIG. 7B.

According to the above embodiments, a signal receiving method could be concluded. In one embodiment, the method can be applied but not limited to the embodiment shown in FIG. 1A. The signal receiving method includes steps shown in FIG. 8.

Step 801: converting a first analog RF input signal $ARFI_1$ to a digital IF input signal DIFI by a receiving path. The first analog RF input signal $ARFI_1$ includes a first signal component and a second signal component. The first signal component conforms to a first wireless transmission standard (e.g. WiFi) and the second signal component conforms to a second wireless transmission standard (e.g. Bluetooth). The signal components are not limited to conform to WiFi or Bluetooth.

Step 803: filtering and down converting the digital IF input signal DIFI ito retrieve the first signal component as a first digital baseband signal $DBFS_1$.

Step 805: filtering and down converting the digital IF input signal DIFI to retrieve the second signal component as a second digital baseband signal $DBFS_2$.

Step 807: processing the first digital baseband signal $DBFS_1$ according to the first wireless transmission standard.

Step 809: processing the second digital baseband signal $DBFS_2$ according to the second wireless transmission standard.

According to the above embodiments, a signal transmitting method can be concluded. In one instance, the method can be applied but not limited to the embodiment shown in FIG. 5A. The signal receiving method includes steps shown in FIG. 9.

Step 901: outputting a first digital baseband signal $DBFS_1$ conforming to a first wireless transmission standard.

Step 903: outputting a second digital baseband signal $DBFS_2$ conforming to a second wireless transmission standard.

Step 905: filtering and up sampling the first and second digital baseband signal $DBFS_1$ and $DBFS_2$ to generate a first digital IF signal $DIFS_1$ and a second digital IF signal $DIFS_2$, respectively.

Step 907: converting the first digital IF signal $DIFS_1$ to a first analog RF output signal $ARFO_1$ and outputting the first analog RF output signal $ARFO_1$, or converting the second digital IF signal $DIFS_2$ to a second analog RF output signal $ARFO_2$ and outputting the second analog RF output signal $ARFO_2$.

According to the above embodiments, a signal transceiving method can be concluded. In one instance, the method can be applied but not limited to the embodiment shown in FIG. 7A. The signal receiving method includes steps shown in FIG. 10.

Step 1001: converting a first analog RF input signal $ARFI_1$ to a digital IF input signal DIFI and outputting the digital IF input signal DIFI by a receiving path 701. The first analog RF input signal $ARFI_1$ includes a first signal component and a second signal component. The first signal component conforms to a first wireless transmission standard and the second signal component conforms to a second wireless transmission standard.

Step 1003: filtering and down converting the digital IF input signal DIFI to retrieve the first signal component as a first digital baseband signal $DBFS_1$.

Step 1005: filtering and down converting the digital IF input signal DIFI in order to retrieve the second signal component as a second digital baseband signal $DBFS_2$.

Step 1007: processing the first digital baseband signal $DBFS_1$ according to the first wireless transmission standard by a first baseband signal processing module 707 or outputting a third digital baseband signal $DBFS_3$ conforming to the first wireless transmission standard by the first baseband signal processing module 707.

Step 1009: processing the second digital baseband signal $DBFS_2$ according to the second wireless transmission standard by a second baseband signal processing module 709 or outputting a fourth digital baseband signal $DBFS_4$ conforming to the second wireless transmission standard by the second baseband signal processing module 709.

Step 1011: filtering and up sampling the third and fourth digital baseband signal $DBFS_3$ and $DBFS_4$ to generate a third digital IF signal $DIFS_3$ and a fourth digital IF signal $DIFS_4$, respectively.

Step 1013: converting the third digital IF signal $DIFS_3$ to a third analog RF output signal $ARFO_3$ and outputting the third analog RF output signal $ARFO_3$, or converting the fourth digital IF signal $DIFS_4$ to a fourth analog RF output signal $ARFO_4$ and outputting the fourth analog RF output signal $ARFO_4$.

Figure 8:
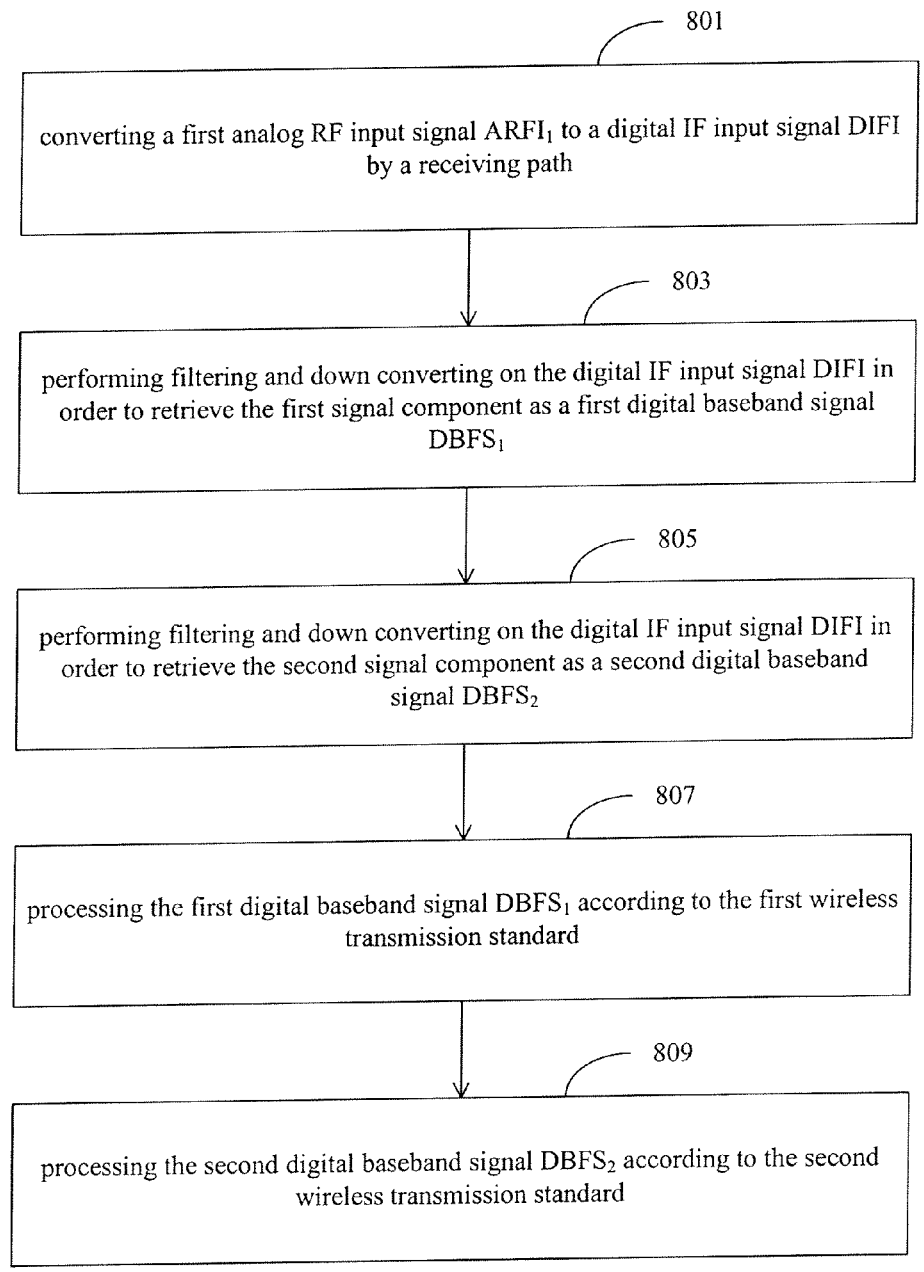
FIG. 8 shows a signal receiving method in accordance with one embodiment of the present invention.
Figure 9:
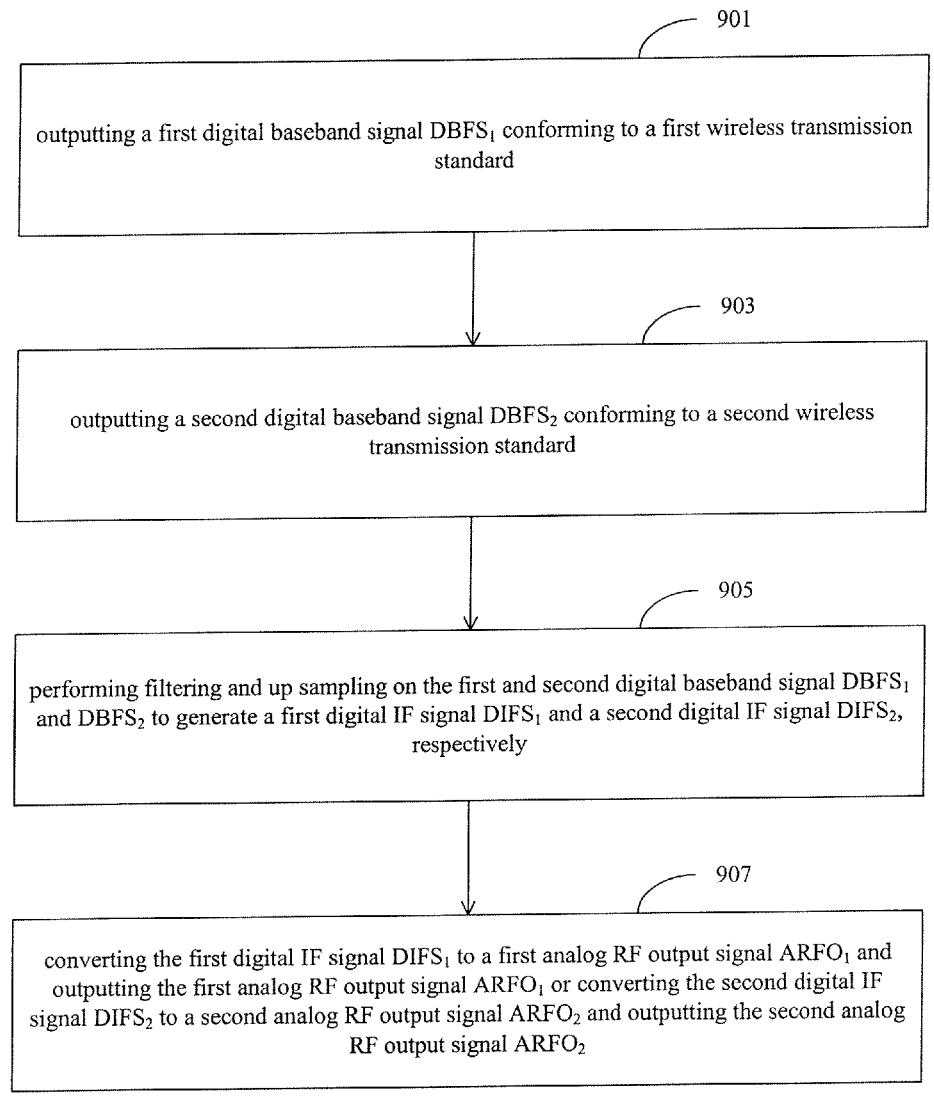
FIG. 9 shows a signal transmitting method in accordance with one embodiment of the present invention.
Figure 10:
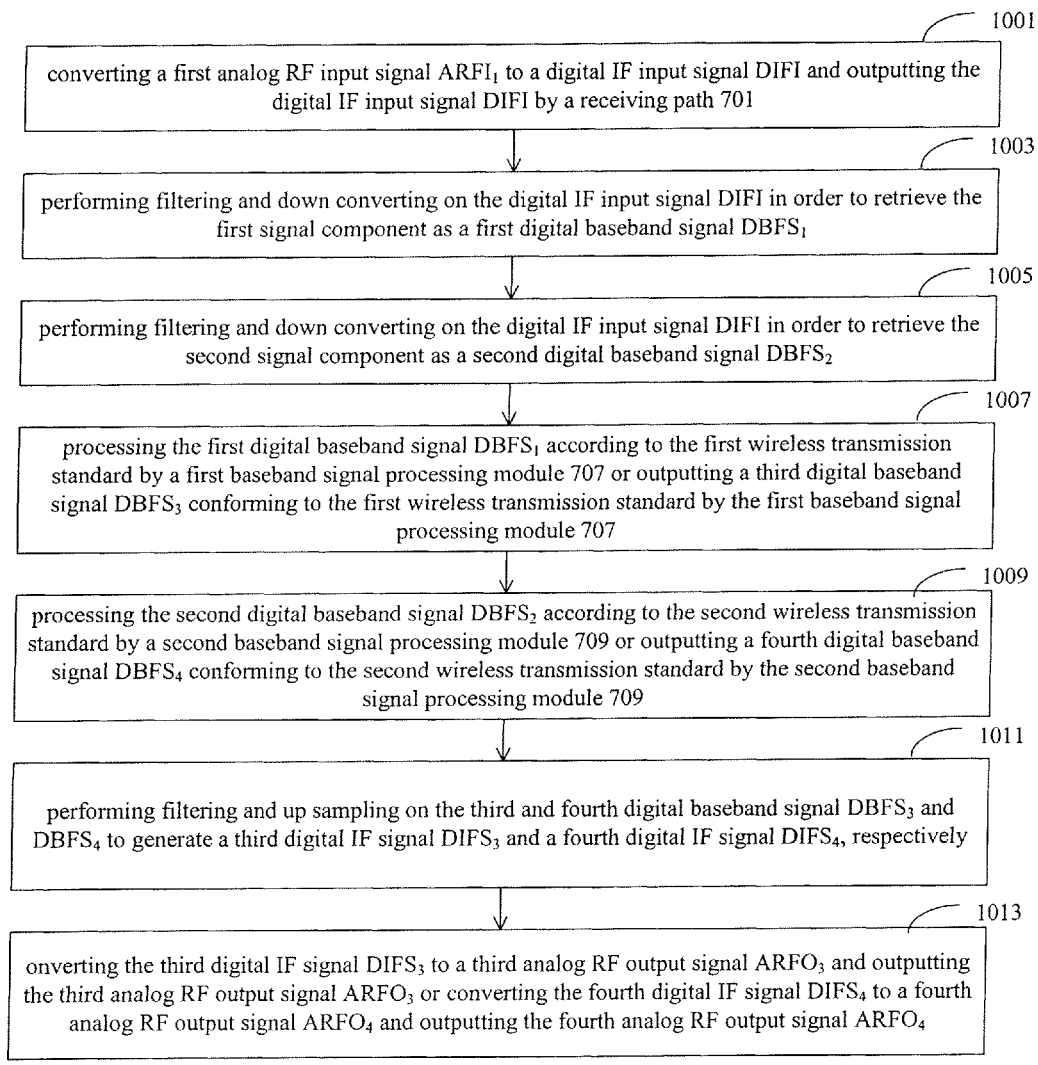
FIG. 10 shows a signal transceiving method in accordance with one embodiment of the present invention.

Details of these steps shown in FIG. 8, FIG. 9 and FIG. 10 are already described and are omitted herein.

According to the above embodiments, it is possible to use single one circuit to transmit signal conforming to different wireless transmission standards to avoid problems addressed in the prior art.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A signal receiving circuit, comprising:
a receiving path, configured to convert a first analog radio frequency (RF) input signal to a digital intermediate frequency (IF) input signal and output the digital IF input signal, wherein the first analog RF input signal comprises a first signal component conforming to a first wireless transmission standard and a second signal component conforming to a second wireless transmission standard, and the digital IF input signal is outputted to be processed according to the first wireless transmission standard and the second wireless transmission standard, respectively;
a first digital down converter, configured to receive and process the digital IF input signal to generate a first digital baseband signal corresponding to the first signal component;
a second digital down converter, configured to receive and process the digital IF input signal to generate a second digital baseband signal corresponding to the second signal component;
a first baseband processing module, configured to process the first digital baseband signal according to the first wireless transmission standard; and
a second baseband processing module, configured to process the second digital baseband signal according to the second wireless transmission standard.

2. The signal receiving circuit of claim 1, further comprising:
a multiplexer, configured to selectively output the first analog RF input signal or the second analog RF input signal to the receiving path, wherein the second analog RF input signal comprises a third signal component and a fourth signal component, and at least one of the third signal component and the fourth signal component conforms to a wireless transmission standard other than the first and the second wireless transmission standards.

3. The signal receiving circuit of claim 1, wherein the receiving path further comprises:
- a mixer, configured to receive a carrier signal and mix the received carrier signal with the first analog RF input signal to generate a mixed RF input signal;
- a down sampling filter, configured to filter and down sample the mixed RF input signal to generate an analog IF input signal; and
- an analog-to-digital converter, configured to convert the analog IF input signal to the digital IF input signal.

4. A signal transmitting circuit, comprising:
- a first baseband signal processing module, configured to output a first digital baseband signal conforming to a first wireless transmission standard;
- a second baseband signal processing module, configured to output a second digital baseband signal conforming to a second wireless transmission standard;
- a first digital up converter, configured to receive and process the first digital baseband signal to generate a first digital IF signal;
- a second digital up converter, configured to receive and process the second digital baseband signal to generate a second digital IF signal; and
- a transmitting path, configured to convert the first digital IF signal to a first analog output signal and output the first analog output signal, or convert the second digital IF signal to a second analog output signal and output the second analog output signal.

5. The signal transmitting circuit of claim 4, wherein the transmitting path further comprises:
- a digital-to-analog converter, configured to convert the first digital IF signal to a first analog IF signal or convert the second digital IF signal to a second analog IF signal;
- an up sampling filter, configured to filter and up sample the first analog IF signal or the second analog IF signal to generate a first analog RF signal or a second analog RF signal; and
- a mixer, configured to receive a carrier signal and mix the carrier signal with the first analog RF signal to generate the first RF output signal, or mix the carrier signal with the second analog RF signal to generate the second RF output signal.

6. A signal transceiving circuit, comprising:
- a receiving path, configured to convert a first analog radio frequency (RF) input signal to a digital intermediate frequency (IF) input signal and output the digital IF input signal, wherein the first analog RF input signal comprises a first signal component conforming to a first wireless transmission standard and a second signal component conforming to a second wireless transmission standard, and the digital IF input signal is outputted to be processed according to the first wireless transmission standard and the second wireless transmission standard, respectively;
- a first digital down converter, configured to receive and process the digital IF input signal to generate a first digital baseband signal corresponding to the first signal component;
- a second digital down converter, configured to receive and process the digital IF input signal to generate a second digital baseband signal corresponding to the second signal component;
- a first baseband processing module, configured to process the first digital baseband signal according to the first wireless transmission standard or output a third digital baseband signal conforming to the first wireless transmission standard;
- a second baseband processing module, configured to process the second digital baseband signal according to the second wireless transmission standard or output a fourth digital baseband signal conforming to the second wireless transmission standard;
- a first digital up converter, configured to receive and process the third digital baseband signal to generate a third digital IF signal;
- a second digital up converter, configured to receive and process the fourth digital baseband signal to generate a fourth digital IF signal; and
- a transmitting path, configured to convert the third digital IF signal to a third analog output signal and output the third analog output signal, or convert the fourth digital IF signal to a fourth analog output signal and output the fourth analog output signal.

7. The signal transceiving circuit of claim 6, further comprises a carrier signal generator configured to generate a carrier signal, wherein the receiving path further comprises:
- a first mixer, configured to receive a carrier signal and generate a mixed RF input signal;
- a down sampling filter, configured to filter and down sample the mixed RF input signal to generate an analog IF input signal; and
- an analog-to-digital converter, configured to convert the analog IF input signal to the digital IF input signal, wherein the transmitting path further comprises:
- a digital-to-analog converter, configured to convert the third digital IF signal to a third analog IF signal or convert the fourth digital IF signal to a fourth analog IF signal;
- an up sampling filter, configured to filter and up sample the third analog IF signal or the fourth analog IF signal to respectively generate a third analog RF signal or a fourth analog RF signal; and
- a second mixer, configured to receive a carrier signal and mix the carrier signal with the third analog RF signal to generate the third RF output signal or mix the carrier signal with the fourth analog RF signal to generate the fourth RF output signal.

8. The signal transceiving circuit of claim 6, further comprising:
- a multiplexer, configured to selectively output the first analog RF input signal or the second analog RF input signal to the receiving path, wherein the second analog RF input signal comprises a third signal component and a fourth signal component, and at least one of the third signal component and the fourth signal component conforms to a wireless transmission standard other than the first and the second wireless transmission standards.

9. A signal receiving method, comprising:
- converting, by a receiving path, a first analog radio frequency (RF) input signal to a digital intermediate frequency (IF) input signal and outputting the digital IF input signal, wherein the first analog RF input signal comprises a first signal component conforming to a first wireless transmission standard and a second signal component conforming to a second wireless transmission standard, and outputting the digital IF input signal to be processed according to the first wireless transmission standard and the second wireless transmission standard respectively;
- processing the digital IF input signal to generate a first digital baseband signal corresponding to the first signal component;

processing the digital IF input signal to generate a second digital baseband signal corresponding to the second signal component;
processing the first digital baseband signal according to the first wireless transmission standard; and
processing the second digital baseband signal according to the second wireless transmission standard.

10. The signal receiving method of claim 9, further comprising:
selectively outputting the first analog RF input signal or the second analog RF input signal to the receiving path, wherein the second analog RF input signal comprises a third signal component and a fourth signal component, and at least one of the third signal component and the fourth signal component conforms to a wireless transmission standard other than the first and the second wireless transmission standards.

11. The signal receiving method of claim 9, wherein the step of converting a first analog radio frequency (RF) input signal to a digital intermediate frequency (IF) input signal comprises:
mixing a carrier signal with the first analog RF input signal to generate a mixed RF input signal;
processing the mixed RF input signal to generate an analog IF input signal; and
converting the analog IF input signal to the digital IF input signal.

12. A signal transmitting method, comprising:
outputting a first digital baseband signal conforming to a first wireless transmission standard;
outputting a second digital baseband signal conforming to a second wireless transmission standard;
processing the first digital baseband signal to generate a first digital IF signal;
processing the second digital baseband signal to generate a second digital IF signal; and
converting the first digital IF signal to a first analog output signal and outputting the first analog output signal or converting the second digital IF signal to a second analog output signal and outputting the second analog output signal.

13. The signal transmitting method of claim 12, wherein the step of converting the first digital IF signal to a first analog output signal and outputting the first analog output signal or converting the second digital IF signal to a second analog output signal and outputting the second analog output signal comprises:
converting the first digital IF signal to a first analog IF signal or converting the second digital IF signal to a second analog IF signal;
processing the first analog IF signal or the second analog IF signal to respectively generate a first analog RF signal or a second analog RF signal; and
mixing a carrier signal with the first analog RF signal to generate the first RF output signal or mixing the carrier signal with the second analog RF signal to generate the second RF output signal.

14. A signal transceiving method, comprising:
converting a first analog radio frequency (RF) input signal to a digital intermediate frequency (IF) input signal and outputting the digital IF input signal by a receiving path, wherein the first analog RF input signal comprises a first signal component conforming to a first wireless transmission standard and a second signal component conforming to a second wireless transmission standard, and outputting the digital IF input signal to be processed according to the first wireless transmission standard and the second wireless transmission standard respectively;
processing the digital IF input signal to generate a first digital baseband signal corresponding to the first signal component;
processing the digital IF input signal to generate a second digital baseband signal corresponding to the second signal component;
processing the first digital baseband signal according to the first wireless transmission standard by a first baseband signal processing module or outputting a third digital baseband signal conforming to the first wireless transmission standard by the first baseband signal processing module; and
processing the second digital baseband signal according to the second wireless transmission standard by a second baseband processing module or outputting a fourth digital baseband signal conforming to the second wireless transmission standard by the second baseband processing module;
receiving and processing the third digital baseband signal to generate a third digital IF signal;
receiving and processing the fourth digital baseband signal to generate a fourth digital IF signal; and
converting the third digital IF signal to a third analog output signal and outputting the third analog output signal or converting the fourth digital IF signal to a fourth analog output signal and outputting the fourth analog output signal.

15. The signal transceiving method of claim 14, further comprising:
selectively outputting the first analog RF input signal or the second analog RF input signal to the receiving path, wherein the second analog RF input signal comprises a third signal component and a fourth signal component, and at least one of the third signal component and the fourth signal component conforms to a wireless transmission standard other than the first and the second wireless transmission standards.

16. A signal receiving circuit, comprising:
a receiving path, configured to convert a first analog RF input signal to a digital IF input signal and output the digital IF input signal, wherein the first analog RF input signal comprises a plurality of signal components conforming to at least one wireless transmission standard;
a digital down converting module, comprising M digital down converters, configured to receive and process the digital IF input signal to generate M digital baseband signals with respect to the plurality of signal components, wherein M is a positive integer equals to or larger than 2; and
N baseband signal processing modules, configured to process the M digital baseband signals according to corresponding wireless transmission standards, wherein N is an positive integer equals to or larger than 2,
wherein the digital down converters and the baseband signal processing modules are interconnected in at least one of the following ways:
each of the digital down converters is coupled to at least one of the baseband signal processing modules; and
each of the baseband signal processing modules is coupled to at least one of the digital down converters.

17. The signal receiving circuit of claim 16, wherein the baseband signal processing modules are configured to process the digital baseband signals according to different wireless transmission standards, respectively.

18. The signal receiving circuit of claim 16, wherein at least two of the baseband signal processing modules process according to the same wireless transmission standard.

19. The signal receiving circuit of claim 16, wherein M equals to N.

20. A signal transmitting circuit, comprising:
N baseband signal processing modules, configured to output N digital baseband signals conforming to at least one wireless transmission standard, wherein N is a positive integer equals to or larger than 2;
a digital up converting module, comprising M digital up converters, configured to receive and process the digital baseband signals to generate M digital IF signals, wherein M is a positive integer equals to or larger than 2; and
a transmitting path, configured to convert the digital IF signals to analog RF output signals, respectively, and outputting the analog RF output signals;
wherein the digital up converters and the baseband signal processing modules are interconnected in at least one of the following ways:
each of the digital up converters is coupled to at least one of the baseband signal processing modules; and
each of the baseband signal processing modules is coupled to at least one of the digital up converters.

21. The signal transmitting circuit of claim 20, wherein the baseband signal processing modules are configured to process the digital baseband signals according to different wireless transmission standards.

22. The signal transmitting circuit of claim 20, wherein at least two of the baseband signal processing modules process according to the same wireless transmission standard.

23. The signal transmitting circuit of claim 20, wherein M equals to N.

24. A signal transceiving circuit, comprising:
a receiving path, configured to convert a first analog RF input signal to a digital IF input signal and output the digital IF input signal, wherein the first analog RF input signal comprises a plurality of signal components conforming to at least one wireless transmission standard;
a digital down converting module, comprising $M_1$ digital down converters, configured to receive and process the digital IF input signal to generate $M_1$ digital baseband signals corresponding to the signal components, wherein M is a positive integer equals to or larger than 2;
N baseband signal processing modules, configured to process the digital baseband signals according to the corresponding wireless transmission standard or output the digital baseband signals conforming to the corresponding wireless transmission standard, wherein N is a positive integer equals to or larger than 2;
a digital up converting module, comprising $M_2$ digital up converters, configured to receive and process the digital baseband signals outputted from the baseband signal processing modules to generate $M_2$ digital IF signals, wherein $M_2$ is a positive integer equals to or larger than 2; and
a transmitting path, configured to convert the digital IF signals to analog RF output signals and output the analog RF output signals;
wherein the digital down converters and the baseband signal processing modules are interconnected in at least one of the following ways:
each of the digital down converters is coupled to at least one of the baseband signal processing modules; and
each of the baseband signal processing modules is coupled to at least one of the digital down converters;
wherein the digital up converters and the baseband signal processing modules are interconnected in at least one of the following ways:
each of the digital up converters is coupled to at least one of the baseband signal processing modules; and
each of the baseband signal processing modules is coupled to at least one of the digital up converters.

25. The signal transceiving circuit of claim 24, wherein the baseband signal processing modules are configured for processing the digital baseband signals according to different wireless transmission standards.

26. The signal transceiving circuit of claim 24, wherein at least two of the baseband signal processing modules process according to the same wireless transmission standard.

27. The signal transceiving circuit of claim 24, wherein at least two of the following values are the same: $M_1$, $M_2$, and N.

* * * * *